United States Patent [19]
Duda et al.

[11] Patent Number: 5,917,011
[45] Date of Patent: Jun. 29, 1999

[54] SHORT-CYCLE REMOVAL OF IMPURITIES FROM POLYMERS

[75] Inventors: John L. Duda; Sacide Alsoy, both of State College, Pa.

[73] Assignee: The Penn State Research Foundation University Park, Pa.

[21] Appl. No.: 08/966,141

[22] Filed: Nov. 7, 1997

Related U.S. Application Data

[60] Provisional application No. 60/029,981, Nov. 7, 1996.

[51] Int. Cl.$^6$ ...................................................... C08F 6/00
[52] U.S. Cl. ................. 528/501; 528/502 R; 528/502 C; 528/503; 521/56; 521/58; 521/60
[58] Field of Search ............................. 121/40.5; 528/56, 528/501, 497, 502 R, 502 C, 503; 521/40.5, 56

[56] References Cited

U.S. PATENT DOCUMENTS

| | | |
|---|---|---|
| 4,306,058 | 12/1981 | Copelin . |
| 5,232,767 | 8/1993 | Lokensgard ............................. 424/490 |

FOREIGN PATENT DOCUMENTS

| | | |
|---|---|---|
| 8286745 | 8/1981 | Australia . |
| 258416 | 4/1925 | Germany . |

OTHER PUBLICATIONS

Goel et al., Plasticization of poly (methyl methacrylate) (PMMA) networks by supercritical carbon dioxide *Polymer*, 1993, 34(7), 1410–1417.

Enscore et al., Diffusion, Swelling, and Consolidation in Glassy Polystyrene Microspheres. *Polymer Engineering and Science*, 1980, 20, 102–107.

Enscore et al., Effect of prior sample history on n–hexane sorption in glassy polystyrene microspheres. *Polymer*, 1977, 18, 1105–1110.

Fleming et al. Carbon Dioxide Conditioning Effects on Sorption and Volume Dilation Behavior for Bisphenol A–Polycarbonate. *Macromolecules*, 1990, 23, 1353–1360.

Sasaki et al., Supercritical Carbon Dioxide Extraction of Benzene in Poly(vinyl acetate) and Polystyrene (Part 2). *Sekiyu Gakkaishi*, 1990, 33(5), 304–310.

Zielinski et al., Predicting Polymer/Solvent Diffusion Coefficients Using Free–Volume Theory. *AICE Journal*, 1992, 38(3), 405–415.

*Primary Examiner*—Duc Truong
*Attorney, Agent, or Firm*—Thomas J. Monahan

[57] ABSTRACT

Impurities dissolved in a solid polymer and/or trapped in the spacial volume of the polymer can be removed quickly and efficiently in one or more relatively short pressurization/depressurization cycles, using a penetrant fluid (e.g. carbon dioxide) having at least some solubility in the polymer. Polymers with inherently slow or delayed elastic recovery at the temperature or temperatures at which the cycle is carried out (e.g. within the range of 20 to 200° C.) or polymers with a high $T_g$ are the ones most efficiently treated. The penetrant is used to expand the polymer matrix, increasing its spacial volume. The pressure is then decreased rapidly, so that the impurities will migrate out of the polymer matrix before the matrix has a chance to relax or return to substantially its original volume. Each complete cycle should last seconds or minutes rather than hours.

20 Claims, No Drawings

5,917,011

SHORT-CYCLE REMOVAL OF IMPURITIES FROM POLYMERS

CROSS-REFERENCE TO RELATED APPLICATION

This application is related to our provisional application No. 60/029,981, filed Nov. 7, 1996, entitled "PULSED SUPERCRITICAL EXTRACTION OF IMPURITIES FROM POLYMERS".

FIELD OF THE INVENTION

This invention relates to a method for removing volatilizable impurities (such as solvents or unreacted monomers) from polymeric materials. An aspect of this invention relates to an extraction method for removing volatilizable impurities from polymers, wherein a solid polymer matrix is exposed to a penetrant fluid under superatmospheric pressure.

DESCRIPTION OF THE PRIOR ART

Over the last several decades, synthetic organic solid polymers have replaced, to a considerable extent, inorganic materials, natural polymers, and other natural materials such as wood in a wide variety of applications, e.g. as packaging and structural materials. For many years, there was very little concern on the part of government or industry connected with this widespread substitution of synthetic organic materials for natural materials or inorganic materials. Solid organic polymers of relatively high molecular weight were often thought of as substantially inert, non-toxic, non-volatile materials, particularly those polymers which are highly crosslinked.

More recently, governmental agencies charged with monitoring health and environmental problems have expressed concern regarding impurities in polymers. In reality, virtually all solid organic polymers can contain volatilizable, low molecular weight materials which can pose environmental and health problems. Presumably, the impurities are either dissolved in solid polymer or trapped in what can be called the "spacial volume" of the polymer, i.e. any space within the solid polymer which is not occupied by the polymer molecules themselves. As "spacial volume" is defined in this application, it includes the "free volume", see J. M. Zielinski et al, *AIChE Journal*, 38, 405 [1992], the fixed-volume intermolecular spaces, so-called microvoids, and any macroscopic voids such as pores or cracks. (The "free volume" can change its shape clue to movement of molecular chains, whereas microscopic and macroscopic voids, pores, and cracks are essentially fixed in volume and unaffected by molecular movement.) For example, there is evidence suggesting that solid polyvinyl chloride pellets give off small amounts of vinyl chloride which may be implicated in certain diseases, that phenol-formaldehyde polymers give off small amounts of formaldehyde gas, and that residual solvents used to make polystyrene or the like can be trapped in—and can escape from—solid polystyrene pellets, foams, and molded articles. Moreover, some solid polymers made from low molecular weight monomers, prepolymers, or oligomers can contain residual polymerization catalysts, and these catalysts can, even under normal ambient conditions, reverse the polymerization process and liberate low molecular weight starting material. And, with the constantly increasing use of recycled polymers, there is concern regarding the presence of impurities which have been absorbed by the virgin polymer during its initial use.

With regard to potential health problems, a wide variety of foods, cosmetics, and other substances which come into contact with or are consumed by humans or animals are packaged in polymeric materials such as films. Governmental agencies are therefore concerned that humans or animals can be exposed to impurities in polymers via ingestion or transdermal transport. With regard to environmental exposure, volatilizable impurities can cause air pollution in general and contamination of closed spaces in particular, as in the case of certain types of thermal insulation for buildings and structural materials used in automobiles and other vehicles.

Quite aside from environmental problems, impurities in specialty polymers (polymers used in optics, electronics, body implants, etc.) can interfere with their function.

One proposed solution to these health and environmental problems involves lowering the amount of impurities trapped in organic polymeric matrices, and legal limits on impurities in polymers are under consideration or being enacted, e.g. in Europe. Two technological strategies have emerged to implement the goal of reducing levels of volatile impurities (sometimes called "devolatilization") in polymers: stripping of impurities from the polymer in the molten state, and extraction of the impurities with the aid of a penetrant fluid. In the stripping method, the molten polymer is generally exposed to subatmospheric pressure or a stripping phase such as steam. The effectiveness of these stripping methods depends upon the rate of diffusion of volatile materials in the polymer as well as phase equilibria of the impurity between the polymer and the vapor state. In many cases, stripping methods cannot meet the stringent impurity level tolerances coming into force or under consideration. As the use of polymer recycling increases, the efficacy of the stripping methods will come under even greater scrutiny, because impurities absorbed by polymers during their primary use will have to be removed before recycling.

Accordingly, the penetrant fluid extraction method is now being studied intensely with the objective of introducing this method into commercial use. Preferred penetrants are fluids which typically are gases under normal ambient temperature and pressure conditions but which are placed under sufficient pressure to be converted to the supercritical phase, a phase which is not, strictly speaking, either gaseous or liquid, but which possesses some of the properties of both gases and liquids. It is particularly preferred in this art that the supercritical fluid be carbon dioxide; $CO_2$ has a high degree of compatibility with a large number of synthetic organic polymers and will quickly diffuse into the polymer matrix and enhance the extraction of impurities. By analogy to many organic solvents, $CO_2$ can exert a swelling effect upon organic polymers. Swelling of the polymer matrix increases the "spacial volume" in the matrix (e.g. the intermolecular spaces or voids, sometimes called "microvoids"), thereby assisting migration or diffusion—and hence removal—of the impurities. This swelling effect is sometimes called "plasticization". Plasticization of polymethyl methacrylate with $CO_2$ has been reported in the literature, e.g. in S. K. Goel et al, *Polymer*, 34, 1410 (1993). It is has been observed that plasticization of the polymer by the supercritical carbon dioxide enhances the difusional rate process and the solubility of the impurity in the supercritical phase improves the thermodynamics or equilibrium of the process.

The known supercritical penetrant fluid extraction processes focus on the supercritical fluid as the extraction medium. That is, the flow of penetrant fluid over the polymer matrix is viewed as the principal means of extracting impurities. Accordingly, exposure to the supercritical fluid is generally somewhat prolonged, so that the impurities will have sufficient time to pass into extraction medium and be carried away by it. Reportedly, longer exposure times result in increased extraction of impurities. Other known ways of increasing extraction utilize increased plasticization (increasing the amount of $CO_2$ absorbed into the polymer matrix, e.g. with increased pressure) or increased temperature, but it would presently appear that the most important parameter in the supercritical fluid extraction method is the time of exposure to the fluid. Accordingly, typical supercritical fluid extraction processes can be time-consuming, resulting either in a need for batch processing or for high space demands in continuous processing.

For additional background in the field of supercritical extraction of impurities, see S. K. Goel et al and J. M. Zielinski et al, cited above, and Copelin, U.S. Pat. No. 4,306,058 (Dec. 15, 1981), D. J. Enscore et al, *Polym. Engineering Sci.* 20:102 (1980), D. J. Enscore et al, *Polymer* 18: 1105 (1977), G. K. Fleming et al, *Macromaol.* 23: 1353 (1990), M. Sasaki et al, *Sekiyu Gakkaishi* 33, 304 (1990).

Thus, there is still a need for a penetrant fluid extraction process having an effectiveness which is less dependent upon the time of exposure to the penetrant fluid.

SUMMARY OF THE INVENTION

It has been observed that polymer matrices which have been swollen in the penetrant fluid extraction method gradually relax and return to, or at least approach, their original volume. However, polymer matrices which are inherently low in elasticity at the extraction temperature or which are swollen at temperatures below, at, or even slightly above the glass transition temperature of the polymer relax very slowly. In some cases, relaxation times in the glassy state are so slow that chain packing perturbations induced by volume swelling with a fluid such as $CO_2$ tend to become a "semi-permanent feature" of the glassy polymer matrix, even when no penetrant fluid is present. See G. K. Fleming et al, supra, *Macromolecules* 23, 1353, at 1355 (1990).

It has now been discovered that this "semi-permanent feature" of a polymeric matrix can be a factor which makes possible a strategy for developing a relatively short-cycle extraction of volatilizable impurities from polymer matrices. In this context, an "extraction cycle" is preferably a pressurization/depressurization sequence wherein the penetrant fluid, applied under pressure, is used principally as a polymer matrix expansion means (largely as a "spacial volume" expansion means) and only secondarily as the extraction medium, and wherein the majority of the extraction takes place when the pressure is relieved (e.g. decreased quickly to normal atmospheric pressure) in the second part of the cycle. In other words, the duty cycle is primarily or even entirely the depressurization part of the pressurization/depressurization cycle, and the pressurization part of the cycle principally serves the purpose of preparing the polymer matrix for rapid migration of the impurity from a highly expanded matrix. It has further been discovered that, optionally, even shorter extraction times can be achieved by pulsed extraction, wherein two or more very brief pressurization/depressurization cycles are employed to bring about a cumulative removal of impurities that would be very difficult to achieve in a single extraction cycle. A still further discovery is that expansion with a penetrant fluid below, at, or very close to the glass transition temperature can increase the "spacial volume" of the polymer matrix to an unexpected degree. Although this invention is not bound by any theory, it is believed that the spacial volume of the solid polymer is increased by more than one mechanism. (As explained above, the "spacial volume" is defined as any space within a solid polymer or solid polymer matrix that is not occupied by the polymer molecules themselves.) Not only are the intermolecular spaces or "microvoids" increased in volume, but, it is believed, the matrix itself can be disrupted, through crazing or through the creation of a network of cracks or fissures in the polymer matrix, thereby shortening the migration path for the volatilizable impurities during depressurization.

The term "matrix", as used in this application, refers to massive bundles or groups of polymer chains or packed polymer chains (which can be essentially linear) or networks (which are typically crosslinked structures). Thus, the "matrix" can contain "spacial volume", and the spacial volume can comprise "microvoids" (microscopic spaces between chains) and/or space within networks. Disruption of the matrix can create additional spacial volume.

Two basic types of polymers can be purified in accordance with this invention: (a) polymers with a high glass transition temperature ($T_g$), generally above −50° C., preferably above 0° C., more preferably above 10° C., and (b) polymers which exhibit essentially no elastomeric behavior at temperatures in some portion (e.g., an at least 5 or 10 Celsius-degree portion) of the range 0 to 300° C., preferably 20–200° C., even if the entire 0 to 300° C. temperature range is above the $T_g$ of that polymer.

Thus, according to this invention, an impurity is extracted or removed from a solid organic polymer matrix in one or a plurality of pressurization/depressurization cycles. In the first or pressurization part of a cycle, the volume of the solid organic polymer matrix containing the impurity or impurities is expanded by exposure of the matrix, under superatmospheric pressure and at a temperature in the range of about 0 to 300° C., to a penetrant fluid capable of expanding the spacial volume within the matrix. The matrix comprises a polymer of either of the two fundamental types described above. The duration of the first (pressurization) part of the cycle is less than about 60 minutes and is preferably just long enough to enlarge the spacial volume of the solid polymer (which spacial volume comprises at least the intermolecular spaces and preferably also additional spaces created by disruption of the matrix) to the desired volume, although the pressurization part of the cycle can optionally be maintained for up to about 10 minutes after this desired volume has been achieved. The duration of both parts of the pressurization/depressurization cycle can vary depending on the nature of the polymer and the size and shape of the polymer specimen. The desired (expanded) spacial volume is sufficient to permit rapid migration of the volatilizable impurity from the matrix and hence will permit removal of a major amount of the volatilizable impurity during one or a plurality of depressurizations in which the cumulative total depressurization time does not exceed about 10 minutes.

As indicated above, the second (depressurization) part of the cycle can begin essentially immediately after the desired expanded spacial volume has been obtained or, optionally, within about 10 minutes thereafter. A rapid decrease of pressure, typically to normal atmospheric pressure (or, optionally, to subatmospheric pressure) is preferably carried out rapidly. The depressurization can be rapid enough to be termed "explosive" (nearly instantaneous). The depressurization permits the penetrant fluid and at least a minor amount (preferably a major amount) of volatilizable impurity to migrate from the matrix. Because the process is conducted at a temperature near, at, or below the glass transition temperature of the matrix polymer, or with a matrix polymer having negligible elastic recovery properties in the extraction temperature range, and/or because the depressurization is conducted so quickly, the resulting migration of volatilizable impurity is carried out before the matrix can effectively relax, i.e. while the expanded spacial volume of the matrix remains essentially at the expanded level (while the matrix is still in the expanded state).

Although a single pressurization/depressurization cycle can remove a significant amount of impurity from the polymer matrix, a plurality of cycles or pulses is preferred when maximum removal of impurities is not achieved in a single cycle. In any case, the cycles or pulses are relatively short in duration, lasting minutes or seconds rather than hours.

The preferred penetrant fluid is carbon dioxide, because of its compatibility with (and ability to expand) a wide variety of polymers, including polycarbonates, polymers derived from unsaturated monomers, polymers containing repeating ether (e.g. oxyalkylene) units, polymers obtained from fluorinated monomers, and other polymers of industrial significance, but other fluids can be used. The use of the supercritical phase is not essential to this invention but elevated pressures are generally preferred. On the other hand, it is essential that the penetrant fluid have at least some solubility in the polymer which is to be treated in accordance with this invention, because of the need for an expansion or swelling effect.

DETAILED DESCRIPTION

I. The Polymer Matrix and the Impurities

The physico-chemical criteria for polymers which can be efficiently treated for impurity removal in the process of this invention include: (a) some degree of compatibility with the penetrant fluid, so that the penetrant fluid can exert a swelling effect upon the polymer, (b) either a high glass transition temperature (>−50° C., preferably >0° C., more preferably >10° C.) or poor elastic recovery (essentially non-elastomeric behavior) in some portion (e.g., at least a 5- or 10- Celsius degree portion) of a temperature range of about 0 to about 300° C., preferably about 20 to 200° C.; and (c) essentially thermoplastic (as opposed to thermoset) behavior, which means that the polymer can be linear or essentially linear or have a low enough crosslink density to satisfy criterion "a", above—typically this would mean a crosslink density of less than one crosslink per 20,000 weight-average molecular weight, $M_w$, more preferably <1 crosslink/50,000 $M_w$.

These polymers (which can be "copolymers", including terpolymers, quater-polymers, etc.) are "solids" at room temperature (in the ordinary sense of the term "solids"), but the polymers of low crystallinity have some of the rheological properties of liquids and are sometimes viewed as "super cooled" liquids. Some of the relatively amorphous polymers can exhibit inelastic or non-resilient behavior (e.g. compression set, cold-flow, etc.).

Polymers of very low weight-average molecular weight, $M_w$, e.g., those having an $M_w$ below about 3,000 or even those below 5,000 molecular weight units (Daltons) can have a high proportion of semi-liquid constituents and can be purified with at least equal efficiency by techniques which do not necessarily rely upon penetrant fluids. Thus, this invention is especially useful with polymers having an $M_w$ above about 5,000 Daltons. There is virtually no clearly-defined upper limit on $M_w$; polymers with molecular weights in the millions of Daltons (e.g., 5 or even 10 million) are known and used commercially. Most commercially interesting polymers have a $M_w$ in the range of about 20,000 to 1,000,000 Daltons.

Although true "elastomers" (polymers which satisfy the ASTM definition of "elastomer") are not preferred for use in this invention, many polymers which can be efficiently treated exhibit fairly strong elastic recovery properties at temperatures above their $T_g$. These, polymers, as indicated above, are generally treated in accordance with the invention at temperatures near, at or below their $T_g$, so that the elastic recovery will be slow or delayed during the depressurization part of the extraction cycle. The polymers which have poor elastic recovery properties at temperatures above their $T_g$ can also be treated in accordance with this invention, even at elevated temperatures in the preferred temperature range of 20–200° C. Typically, these polymers are highly crystalline but can still contain 2% by weight or more of amorphous regions. Amorphous regions can contain impurities; moreover, during use, these highly crystalline polymers can absorb or adsorb impurities which should be eliminated to permit further use or for recycling.

Polymers treated according to this invention are typically treated for impurity removal after polymerization but prior to shaping (e.g., molding, extruding, skiving, etc.). Alternatively, specially polymers used in optics, electronics, or biological implants can be treated at some stage after being shaped, e.g. before recycling or after exposure to a contaminated environment. Since polymers of this invention are normally high in thermoplastic properties, they are typically shaped into articles (molded parts, films, fabrics, etc.) after polymerization. If the polymer must be shaped in an uncured or monomeric or pre-polymeric stage, the cured polymer is then presumably too resistant toward swelling with a penetrant fluid to be purified by the method of this invention.

Thus, fully-formed electronic components fabricated from specialty polymers (e.g. polymers with excellent electrical properties such as polytetrafluoroethylene) can pick up volatilizable impurities in the manufacturing or use environment and can therefore benefit from devolatilization.

A wide variety of organic polymeric materials are commercially significant, the most significant being polymers obtained from (a) unsaturated monomers, typically vinyl monomers, including vinyl alcohol esters and vinyl alcohol and vinyl chloride; olefins, including both mono-olefins, di-olefins, and other olefinic compounds having more than one double bond as well as cyclo-olefins, halogenated olefins such as tetrafluoroethylene, vinylidene chloride, and trifluorochloroethylene, and aromatically-substituted olefins such as styrene, α-methyl styrene, and ethyl styrene (from the standpoint of this invention, styrenic polymers belong in a different class from vinyl compounds, due to their ease of solubility in aromatic solvents, even though styrene is sometimes referred to as "vinyl benzene"); free radical-initiated polymerizable monomers such as the acrylics, acrylates, and methacrylates; and (b) polymers in which oxygen- or sulfur- or nitrogen-containing functional groups form repeating linkages between aliphatic, cycloaliphatic, or aromatic residues, particularly condensation polymers and active hydrogen-cured polymers(polyesters, phenolic polymers, polyamides, polyimides, polyoxylalkylenes and other polyethers, polyepoxides, polyurethanes, polyarylene sulfides, polyarylene oxides, polysulfones, poly[carbonate] polymers, etc.). The largest commercial volume of these polymeric materials tends to fall into the field of either polymerized unsaturated monomers, particularly polyolefins, vinyl polymers, and styrenics, or condensation polymers, particularly polyesters. These polymers typically have at least some degree of compatibility with penetrants such as carbon dioxide, low molecular weight hydrocarbons, low molecular weight halogenated hydrocarbons, or low molecular weight ethers. Nitrogen-containing polymers can be expected to have some degree of compatibility with ammonia, and sulfur-containing polymers can be expected to have some degree of compatibility with sulfur dioxide or other sulfur-containing gases. Accordingly, all of the commercially significant, essentially thermoplastic (linear or low crosslink-density) polymers can be treated in accordance with the principles of this invention. Moreover, the free volume of a large number of commercially significant polymers has been measured, thereby providing a sound theoretical framework for the principles of this invention. See, for example, the Zielinski et al reference, cited previously.

According to the chemical literature, $CO_2$ has been used successfully to swell polymer matrices comprising polystyrene, poly(alkyl acrylates) such as polymethyl methacrylate, poly(carbonate), vinyl polymers, particularly poly(vinyl acetate) or its hydrolyzate, poly(vinyl alcohol), and other commercially significant polymers.

Although at least some compatibility with or solubility in the solid polymer is essential in this invention, due to the "plasticization" effect described previously, expansion of the spacial volume of a polymer matrix can be obtained with various penetrants, including compressed carbon dioxide, even when compatibility is relatively low. Because this invention does not rely significantly upon the penetrant as an extraction agent but more as a spacial volume-expanding agent, a very modest degree of solubility in the polymer is sufficient, particularly when the penetrant disrupts the polymer matrix and thereby introduces tiny voids into the solid polymer structure.

If the process of this invention disrupts any molecular chains, the average molecular weight of the polymer can be decreased, which could be disadvantageous, unless the shorter chains are driven apart from each other by the penetrant, thereby increasing spacial volume. The sorption of the penetrant by the polymer, particularly when the polymer is in the glassy state (at a temperature below its $T_g$), can be analyzed using various models of a polymer matrix, e.g. the "dual mode" model described in G. K. Fleming et al, cited previously. Regardless of the sorption model that one adopts, the important factor underlying the theory of this invention is that the total spacial capacity of the solid polymer, referred to previously as the "spacial volume" is increased for a period of time sufficient to permit migration of impurities from the polymer. In the present invention, it is believed that this spacial capacity of the polymer is further expanded through disruption of the matrix. Accordingly, even expansion of the spacial volume via the conventional swelling mechanism is not large, one can still obtain a considerable expansion in the spacial volume capacity of glassy-state polymers ($T_{polymer} < T_g$) by the disruption mechanism, thereby compensating, in part, for a modest effect obtained via swelling.

Elastomeric polymers (which typically have very low glass transition temperatures) can be treated in accordance with this invention if the pulses or pressurization/depressurization cycle or cycles is or are very short. It is particularly important that the depressurization part of the cycle be very brief, e.g. from 0.1 second to about a minute. (Typical elastomers can have $T_g$ values well below 0° C.) As a general rule, elastomeric polymers are difficult to treat in accordance with the principles of this invention and hence are not preferred, although some removal of impurities can be obtained with some rubbery materials. Longer depressurization times can be used with polymers which are typically non-elastomeric and have a high glass transition temperature, e.g. above 0°, preferably above 10° C. Both crystalline and amorphous polymers can be treated. Theoretically a 100% pure crystalline polymer could be free of volatilizable impurities, but virtually all "crystalline" polymers contain at least some amorphous regions which can contain impurities removeable in accordance with this invention. In the case of 1-olefin polymers such as polypropylene, the degree of isotacticity is not critical; isotactic, syndiotactic, and atactic polymers can all be treated in accordance with the invention.

Levels of crosslink density, as indicated above, are limited. Depending on the nature of the polymerization catalyst, the use or exclusion of crosslinking agents, the nature (e.g. branched or linear) of the monomers, and similar factors, the solid polymer matrix can be essentially linear or can be highly crosslinked, e.g. as high as one crosslink per 5,000 molecular weight units (Daltons), but low crosslink densities, e.g. <1 crosslink per 20,000 Daltons, still better, <1 per 50,000 Daltons are preferred. Thermoset or highly crosslinked polymers are difficult to dissolve and can be virtually insoluble in the commonly-used organic solvents; these polymers therefore resist swelling to a greater degree than linear polymers and polymers of low crosslink density. The present invention is believed to be more effective with the more easily swellable or expandable types of polymer.

As indicated previously, polymers obtained from a plurality of monomers (including terpolymers, quaterpolymers, etc.) can be treated in accordance with this invention and can be block, random, or graft copolymers.

Specialty polymers are of particular interest in this invention, because their high economic value justifies purification by the best-available technology. Polymers (including copolymers) made from fluorinated monomers, e.g. polytetrafluoroethylene ("PTFE"), polyhexafluoropropene, polytrifluorochloroethylene, polyvinylidene fluoride, polyvinyl fluoride, polytrifluoropropene, etc. are of special interest because of their significant degree of compatibility with $CO_2$ and high value-added applications. The crystallinity of PTFE is very high (>90%), and, despite its low $T_g$, its rate of elastic recovery, even at elevated temperatures, is very slow; it is primarily linear and hence thermoplastic, and despite its almost unique ability to resist solvents, it has some compatibility with $CO_2$ at workable extraction temperatures. Thus, PTFE meets the physico-chemical criteria of this invention, described above. Other fluorine-containing polymers, even poly(trifluorochloroethylene), can be swollen by various organic solvents at room temperature. Fluorinated polymers obtained from monomers having one or more hydrogen atoms are relatively soluble compared to PTFE; poly(trifluoroethylene), for example, is soluble in acetone.

When polymers are treated in accordance with this invention, particularly when subjected to very rapid depressurization (e.g. "explosive" depressurization), they develop a milky color, which is believed to indicate the formation of small bubbles or cracks or fissures in the polymer matrix. This invention is not bound by any theory, but it is believed that the use of temperatures below the glass transition temperature is expected to increase the likelihood of this effect. Even if the disruption of the polymer matrix does not result in networking or interconnecting of the thus-induced voids, it is believed that the spacial volume is increased, hence impurities in a dissolved state have more space into which they can escape from the solid polymer.

Thus, polymers most preferably treated in accordance with this invention can contain volatilizable unreacted unsaturated monomers (especially vinyl compounds, styrene and substituted styrenes, halogenated alkenes, and acrylic and alkylacrylic compounds), volatilizable monomers which form poly(carbonates), and volatilizable monomers having at least one and typically two or more functional groups which form ester or ether linkages. Other important impurities include phenolic monomers, alkylene oxides, $C_1$–$C_6$-aldehydes or alcohols (including polyols), amines, and monofunctional or polyfunctional isocyanates. Although some of these low-molecular weight compounds boil (under normal ambient conditions) at temperatures as high as, for example, 250° C., they can be volatilized through an explosive pressure drop (as in the second half of a pressurization/depressurization cycle) or by application of subatmospheric pressure.

Other typical impurities subject to removal in accordance with this invention include organic solvents which are liquid under normal ambient conditions and can also have boiling points as high as, for example, 250° C.; they are also volatilized by rapid decreases in pressure or by application of a vacuum. Typical solvents—which can serve as reaction media for polymerization of monomers—include aromatic, aliphatic, and cycloalphatic hydrocarbons (particularly aromatic solvents such as benzene, ethyl benzene, toluene, and xylene); $C_1$–$C_{12}$ ethers (including cyclic ethers such as tetrahydrofuran) and alcohols (including polyols); aliphatic, aromatic, and cycloaliphatic compounds substituted with functional groups (e.g. aromatic nuclei substituted with amino, nitro, hydroxyl, or ether groups); and lower aliphatic carboxylic acid ester or ketone solvents such ethyl or methyl acetate or propionate and acetone or methyl ethyl ketone.

II. Penetrant Fluids

As noted previously, the preferred penetrant is carbon dioxide in a compressed state. The supercritical state of carbon dioxide is obtained, at 31° C., under a pressure of approximately 73 atmospheres (about 7.5 Mpa). At 40° C., greater pressure is needed (about 8.4 MPa).

It is not essential to this invention that the fluid be the supercritical state, but since it is preferred that the fluid be under pressure, fluids which are liquid under normal ambient conditions (e.g. alkanes having at least 5 carbon atoms, halogenated alkanes, halogenated alkenes, alcohols, aliphatic ethers, water, and cyclic ethers) are preferably volatilized by heating when used in this invention. Accordingly, in order to provide more freedom of choice with regard to temperature conditions, it is preferred to use polar and non-polar organic liquids with a high vapor pressure at 20–30° C., such as low molecular weight hydrocarbons, halogenated hydrocarbons, ethers, and alcohols (particularly methanol). Such high vapor pressures are easily provided by organic liquids boiling at relatively low temperatures and at normal ambient pressure, e.g. at <60° C., preferably <40° C. Low molecular weight hydrocarbons (e.g. $C_1$–$C_4$ alkanes and alkenes and even halogenated hydrocarbons such as methyl chloride) are gases at room temperature and atmospheric pressure. Formaldehyde is a gas at room temperature, and acetaldehyde has a vapor pressure of nearly one atmosphere at room temperature. All of these organic compounds can be expected to have swelling effects analogous to the swelling effects of liquid polar and non-polar organic solvents.

Water is a relatively high-boiling fluid, but water vapor can be used in this invention.

It is preferred that the penetrant fluid be soluble to the extent of at least about 1 part per 100 parts by weight of polymer (1 phr), more preferably at least about 5 or 10 phr. Solubility of the penetrant in the polymer can be improved by adding surface-active agents to the fluid.

III. Pressurization/Depressurization Cycles

The total duration of a single cycle or pulse can be less than 60 minutes, preferably less than about 10 minutes, and the pressurization (polymer expansion) part of the cycle or pulse can be either longer or shorter than the depressurization part. It might be expected that the period of low pressure would have to be longer than the period of polymer expansion, since the polymer expansion step can be considered complete as soon as the spacial volume of the polymer has been significantly increased. Surprisingly, however, very short depressurizations are extremely effective, particularly when conducted explosively. It is also surprising that the pressurization or polymer expansion part of the cycle or pulse can be as short as 5 minutes or, more preferably, about 1 or 2 minutes. The depressurization is preferably very rapid. For example, the pressure can be decreased from several atmospheres (e.g. 25 to 150 atmospheres gauge) down to one or two atmospheres gauge pressure or to normal ambient pressure or to subatmospheric pressure in less than about 10 seconds, e.g. about 0.1 to 2 seconds.

In the case of an explosive depressurization, it can be completely unnecessary to maintain the low pressure level for longer than 10 seconds; if convenient, the duration of the pressure drop can be coextensive in time with the duration of the entire depressurization part of the cycle. Although this invention is not bound by any theory, comparative data strongly suggest that the impurity removal process is more effective with a plurality of short cycles utilizing explosive depressurization or decompression (e.g. two or three cycles, hence two or three explosive depressurizations) than it is with a single, relatively long depressurization cycle lasting a minute or longer, particularly when the relaxation rate of the expanded polymer requires more time than the depressurization part of the cycle (as in the case of semi-permanent expansion of the polymer).

Thus, as a general rule, the pressurization part of the cycle or pulse lasts from about 30 seconds to about 10 minutes (preferably less than 5 minutes), and the depressurization part of the cycle or pulse lasts from 0.1 second to about 5 minutes (preferably less than 10 seconds). It is preferable to remove at least a major amount of the impurity (e.g 51 to 75% by weight) during a single cycle or pulse. Essentially total removal of an impurity or an asymptotic approach to a very low level (e.g. 5% or 10% of the original level) appears to be within the reach of the present invention if a plurality of pulses is employed. It is believed to be particularly significant that, even if, say, 10 pulses were employed, the total duration of the 10-pulse treatment could still be less than an hour and could even be as short as 10 or 20 minutes, yet one could get the impression from the scientific literature that the pressurization part of a single cycle alone would have to be more than an hour long to be truly effective, and the depressurization part of the cycle would have to last at least a few minutes.

The cycle time can be shortened somewhat by carrying out the cycle at elevated temperatures (temperatures above 40° C. or 50° C., e.g. 60–200° C.), so long as the temperature is not too far above (e.g. $\leq$20 Celsius degrees above) the $T_g$ of high-$T_g$ polymers.

In the following non-limiting Examples, all parts and percentages are by weight unless otherwise indicated.

EXAMPLE 1 (Single-Cycle Treatment/Fast Depressurization)

Samples A and B were taken from a polystyrene film of 0.0101 cm thickness. The film was analyzed and was found to contain 3.37 wt.-% toluene as an impurity. Both samples were exposed to the flowing supercritical fluid ($CO_2$ at 40° C. and 1200 psi gauge=8.4 Mpa; the $T_g$ of polystyrene is approximately 100° C.) for approximately a minute. Then Sample A was depressurized over about a minute's time while Sample B was explosively depressurized over a period of approximately a second. Sample A, the sample that had a one-minute depressurization was found to have 2.15 wt. % toluene remaining. Sample B which was explosively depressurized over a period of approximately one second was found to have 1.61 wt. % toluene remaining.

Based upon these data, it was concluded that:
 a. A significant amount of impurity removal presumably must occur during the depressurization step since the samples were only exposed to the flowing supercritical fluid for one minute.
 b. There is a very significant increase in impurity removal associated with quick depressurization. This is consistent with relaxation phenomena; it was concluded that the impurity removal taking place during depressurization was essentially completed before the polystyrene could effectively relax.

EXAMPLE 2 (Comparison Using Slower Cycle)

A polystyrene film sample having a thickness of 0.011 cm was analyzed and found to contain 5.17 wt. % toluene as a trapped impurity. Two experiments were conducted. In each case, the samples 1 and 2 of this film were exposed to the flowing supercritical fluid ($CO_2$ at 40° C. and 1200 psi gauge pressure=8.4 Mpa) for an hour, and then they were depressurized. Sample 1 was depressurized slowly and Sample 2 was depressurized more quickly. In both cases, these depressurizations took place over a period of minutes. The results of these experiments indicated that the wt. % of toluene left in the sample which was depressurized slowly was 0.89 and the wt. % left in the sample depressurized quickly was 0.69.

From these two experiments, when compared to Example 1, it was concluded that a major fraction of the impurity removal took place during the one-hour exposure to the supercritical fluids and that removal of the impurity by using pressurized or supercritical $CO_2$ as an extractant is relatively inefficient compared to explosive depressurization. Samples 1, 2, A, and B, after the supercritical treatment changed appearance by acquiring a milky color. It was concluded that during quick relaxation, the samples craze or small bubbles or cracks or fissures are formed in the sample. This crazing, or milky color, is even more apparent in Samples A and B, which were depressurized faster than Samples 1 and 2.

What is claimed is:

1. A method for removing an impurity from a polymer in one or a plurality of pressurization/depressurization cycles, comprising:
 (a) in a first part of a said cycle, expanding the volume of a solid organic polymer matrix, said matrix comprising a polymer containing a volatilizable impurity, by exposure of the matrix, under superatmospheric pressure and at a temperature ranging from about 0 to about 300° C., to a penetrant fluid composition capable of expanding the spacial volume within said matrix, the duration of said first part of the cycle being less than about 60 minutes but being sufficient to enlarge said spacial volume to an expanded spacial volume which permits removal of a major amount of said volatilizable impurity during one or a plurality of depressurizations in which the cumulative total depressurization time does not exceed about 10 minutes,
 (b) within about 10 minutes from the enlargement of said spacial volume to said expanded spacial volume, releasing at least a portion of said superatmospheric pressure over a period of time, not more than about 5 minutes, sufficiently short in duration to obtain migration from said polymer of an amount of said volatilizable impurity; the total amount of volatilizable impurity removed from said polymer in one said pressurization/depressurization cycle being greater than can be extracted by conducting one extraction with the same penetrant fluid composition for essentially the same period of time as the time consumed by the one said pressurization/depressurization cycle.

2. The method according to claim 1, wherein additional impurity is removed from said matrix by carrying out at least a second pressurization/depressurization cycle, said second cycle comprising:
 (c) repeating the exposure of said matrix to said penetrant fluid, under superatmospheric pressure and at a said temperature, and, subsequently, (d) depressurizing said matrix, essentially while said matrix is in said expanded state.

3. The method according to claim 1, wherein the expanded spacial volume within said matrix is defined by the intermolecular spaces and disruptions in said matrix.

4. The method according to claim 1, wherein said step (b) is commenced essentially immediately after the enlargement of said spacial volume to said expanded spacial volume, and wherein said depressurizing step decreases the superatmospheric pressure essentially to normal atmospheric pressure.

5. The method according to claim 2, wherein the expanded spacial volume within said matrix is defined by the intermolecular spaces and disruptions in said matrix.

6. The method according to claim 1, wherein the duration of said step (b) is shorter than the duration of said step (a).

7. The method according to claim 6, wherein said step (b) is an explosive depressurization.

8. The method according to claim 1, wherein the duration of said step (a) ranges from about 30 seconds to 10 minutes, and wherein said step (b) has a duration ranging from 0.1 second to about 1 minute.

9. The method according to claim 2, wherein the duration of said step (a) ranges from about 30 seconds to 2 minutes, and wherein said step (b) has a duration ranging from 0.1 second to about 1 minute.

10. The method according to claim 2, wherein the sequence of said step (c) followed by said step (d) is repeated at least once.

11. The method according to claim 2, wherein:
 the glass transition temperature of the polymer or polymers of said organic polymer matrix is at least 0° C., and the temperature at which said step (a) is conducted is below said glass transition temperature, and wherein said penetrant fluid is a gas capable of being dissolved in the polymer or polymers of said organic polymer matrix to the extent of >1 phr.

12. The method according to claim 1, wherein a major amount of said volatilizable impurity is removed during said step (b).

13. The method according to claim 2, wherein a major amount of said volatilizable impurity is removed by the combination of said steps (b) and (d).

14. The method according to claim 1, wherein said penetrant fluid is carbon dioxide.

15. The method according to claim 1, wherein said penetrant fluid is under sufficient superatmospheric pressure to be in the supercritical phase.

16. The method according to claim 1, wherein the volatilizable impurity comprises an organic solvent which is liquid under normal ambient conditions.

17. The method according to claim 1, wherein the volatilizable impurity comprises an unreacted monomeric residue from the process of preparation of the polymer of the matrix.

18. The method according to claim 1, wherein the polymer matrix comprises a polymer obtained by polymerization of an unsaturated monomer.

19. The method as claimed in claim 2, comprising the following additional steps:

(e) recovering a purified polymer, and (f) shaping said purified polymer.

20. The method according to claim 1, wherein each pressurization/depressurization cycle is carried out at a temperature above the glass transition temperature of the polymer or polymers of said organic polymer matrix, but within a range of temperatures at which said polymer does not exhibit elastomeric behavior.

* * * * *